Feb. 28, 1967 W. BAUER 3,307,153
METHOD OF PERFORMING ON-THE-FLY SEARCHES FOR INFORMATION STORED ON TAPE STORAGES OR THE LIKE
Filed June 12, 1963
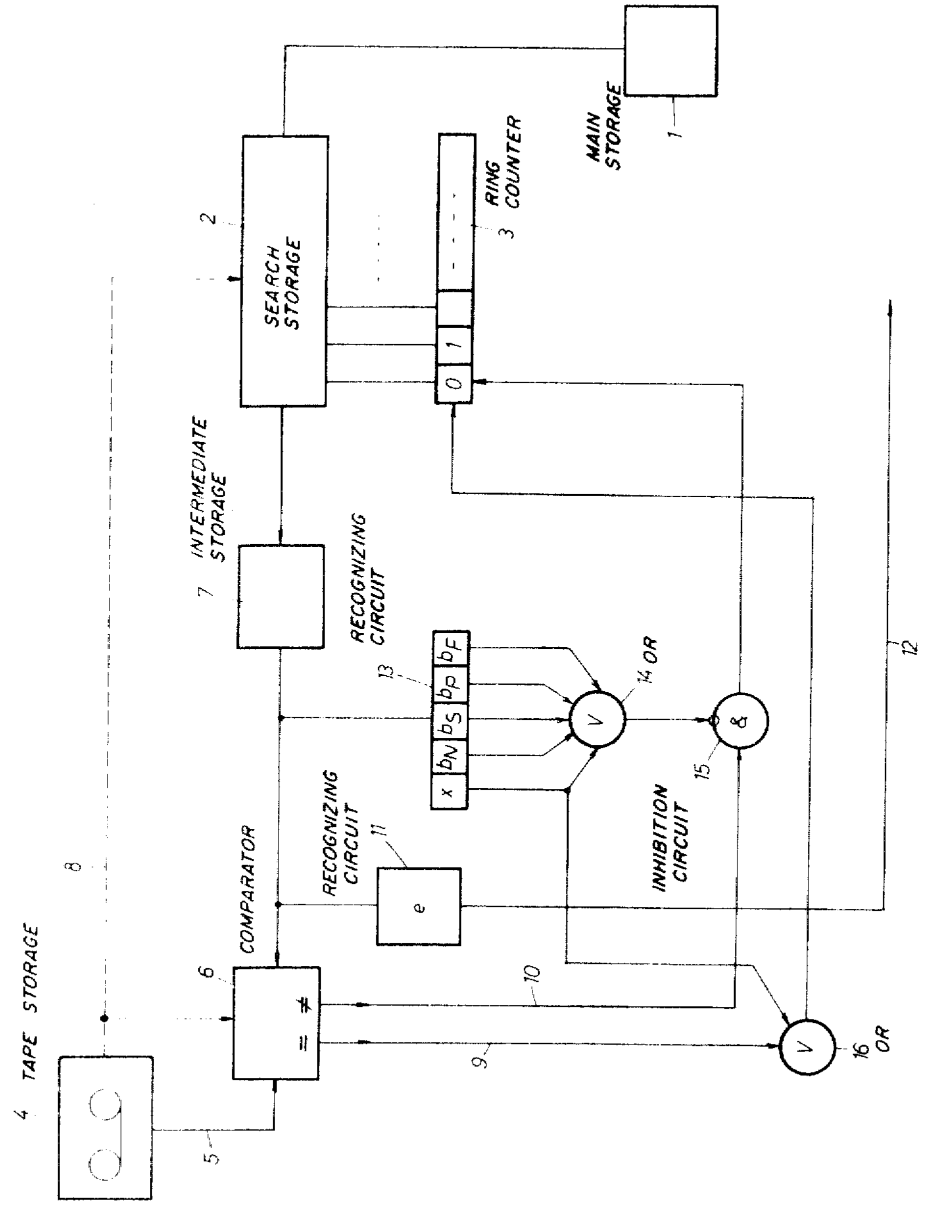

United States Patent Office 3,307,153

Patented Feb. 28, 1967

3,307,153

METHOD OF PERFORMING ON-THE-FLY SEARCHES FOR INFORMATION STORED ON TAPE STORAGES OR THE LIKE

Walter Bauer, deceased, late of Stuttgart, Germany, by Magda Bauer, nee Beck, Stuttgart, Germany, Gabriele Degenkolb, nee Bauer, Stuttgart-Sillenbuch, Germany, and Barbara Bauer, Haltingen, Germany, legal heirs, assignors to International Standard Electric Corporation, New York, N.Y., a corporation of Delaware Filed June 12, 1963, Ser. No. 287,448

Claims priority, application Germany, June 16, 1962, St 19,369

1 Claim. (Cl. 340—172.5)

The present invention relates to a method of performing on-the-fly searches for information stored in a blockwise fashion on tape storages or the like, based on search criteria, contained in the information itself.

As a rule, the information as stored on tape storages is divided into blocks of equal length. The length of the blocks is substantially determined by the capacity of the buffer storage arranged between the tape and the magnetic core storage or processing electronics respectively. Special address fields which are arranged ahead of the blocks, then permit the search for the information as stored in the respective block; for example, the addresses may consist of the account numbers, and the block information may consist of the movements relating to the respective accounts. The call-up devices of conventional arrangements operate in such a way that the address field is read into a comparator and the tape feed is stopped upon detecting an identity of an address, in order to enable the later read-out of the subsequently following information.

In many cases, however, the addresses become so voluminous with respect to their numbers of characters, that it appears to be unsuitable to carry out the above mentioned division. As long as the addresses, as in the case of account numbers, are really addresses, and are also known as such, it would be possible to store the addresses individually in combination with the respective information. However, in cases where the search addresses themselves contain information, or vice versa, parts of the information may serve as search addresses or search criteria. In such cases a sorting of the information with prefixed addresses can no longer be carried out in a sensible way, especially when the information is obtained arbitrarily and is also stored in this order of succession, and in cases where it is not known beforehand, in accordance with what search criteria the search is to be carried out later on. To this there is still to be added that often there has to be searched for combinations of search criteria. The replacement of the information by key words is of little value since in such case the key words would have to be detected prior to the search processes.

As one example relating to the above problem, there is to be mentioned the storing of lists of names, and the later search for a certain name in this list. Combined search criteria will result, for example, in cases where flight bookings are recorded on the tape storage, and when the name of a certain passenger is supposed to be looked up who has booked for a certain flight. Because in this case several names may be assigned to a certain flight, and the search must extend to combined search criteria, with the search criteria themselves being separated by other search criteria or information. With the aid of the conventional search methods and search arrangements, however, this search can no longer be carried out in the course of one search process.

The invention is based on the problem of providing a method permitting to solve the above mentioned problems in an expeditious manner. The general idea of the invention resides in the fact that the search information is compared in a character-wise fashion, by being stepped on in the storage rhythm, with the stored information, and that in the case of a positive result of the comparison each time the next character of the searched information is offered to the comparison until there is detected the end character serving as the last character of the search information, thus successively interrupting the search process, and that in the case of a negative result of the comparison the search process is continued with the next character of the tape storage and the first character of the search storage.

According to what is taught by the general idea of the invention, all search problems can be solved even if several search criteria are to be searched for simultaneously, as long as these search criteria are in a direct succession without other information items being interspersed. However, if certain information items are supposed to be skipped, then, prior to each search criterion, there is stored a control character identifying this search criterion, and upon recognition of a control character in the search information, and in the case of a negative result of the comparison, the comparison process is interrupted until the same control character is offered to the comparison from the tape storage.

In the existence of search criteria having a fixed word length, and if during the search process not all characters of this search criterion are supposed to be involved in the comparison then, instead of the non-required characters, there may be provided a special character for effecting that the comparison, also in the case of a negative result of comparison, is stepped to the next character of the search information. This problem arises, for example, in cases where a certain name is looked for which was recorded in connection with a certain flight with the other data concerning this flight, besides the data characterising the flight, being unimportant.

One advantageous arrangement for carrying out the inventive type of method will now be described with reference to the accompanying drawing.

Considering at first an example in which the tape storage contains a list with the names of several persons, as well as the data relating to these persons, such as place of residence, vocation, and if so required still the date of birth. From this list a certain name is now supposed to be picked out in the course of an on-the-spot search in order that the information relating to these names will be available.

To this end the search information, in the present example only the name, is transferred from the main storage 1 to the search storage 2. The search storage 2 contains several storage cells for receiving each time one character of the search information. It will now be assumed that the tape storage 4 contains in a certain storage block, a list of names which, in part, may look as follows:

. . . *y* MEYER *y* STUTTGART *y* ARCHITEKT *y* MÜLLER *y* MÜNCHEN *y* LEHRER *y* . . .

From this list there is supposed to be picked out the name MÜLLER, so that in the search storage 2 the name MÜLLER is recorded as follows:

*y* MÜLLER *y* *e*

The character *y* symbolizes the distance between the individual search information, whereas the character *e* serves as the end or terminating character.

The search storage 2 cooperates with the ring counter 3, i.e. each time the output of one counting stage is connected to one storage cell of the search storage. The information items which are taken in a character-wise fashion from the symbolically represented magnetic tape 4 are applied via the information lead 5 to the comparator 6. Moreover, in the read-out rhythm, the character as recorded in the intermediate storage 7 is offered to the comparator 6 for comparison. In this intermediate storage 7 there is each time stored that particular character of the search storage 2 whose associated stage of the ring counter 3 is marked. Accordingly, the ring counter 3 possesses as many stages as positions are contained in the search storage 2. The rhythm or clock-pulse for storing the information into the intermediate storage 7 or the comparator 6 respectively is derived from the magnetic tape reader, as is symbolically denoted by the clock-pulse lead 8.

The comparator 6 comprises two outputs 9 and 10; the output 9 is marked when the result of the comparison is positive, in other words, when the two offered characters are alike, whereas the output 10 is marked in cases where these two characters are not alike. By a marking on the line 9 it is effected that the ring counter 3 is stepped by one step, whereas a marking on the line 10 causes the resetting of the counter to zero.

As soon as the beginning of the block has been found in the tape storage there is started the comparison with the initial character of the search storage which, for the sake of simplicity, is likewise designated *y*. The first comparison provides a positive result, so that now the ring counter 3 is stepped on and the letter M is fed to the intermediate storage 7. Accordingly, the second comparison cycle will likewise show a positive result, so that the letter E is fed into the intermediate storage 7 in the course of the next cycle which, in the course of the comparison with the next character of the tape storage, will provide a negative result. On account of this, and via the line 10, there is effected the resetting of the ring counter 3 to zero, so that now the initial character *y* is stored again into the intermediate storage 7. As will be easily recognized, all of the following comparison processes are negative—when disregarding the spacing character y—until the name "MÜLLER" has been found, and the end or terminating character *e* is read out of the search storage. This character is recognized by the recognizing circuit 11 which, via the line 12 will effect that the search process will be interrupted with the result "SUCCESS" ("ERFOLG"), thus permitting the read-out of the respective block information.

With the aid of the arrangement described hereinbefore, the search may be directed not only to the names, but also to the vocations and the other search criteria of the list. Moreover, it is also possible to search for parts of the search criteria which may be the case, for example, if a search is to be made for a certain name of which only the first three letters are available. In this case all names starting with these three letters are picked out in order to look for the correct information in the course of a later process, which might be performed visually. Moreover, it is possible with the aid of the described arrangement, to search for several interconnected search criteria.

However, if the search is to extend to combinations of search criteria or to several search criteria which are separated by other search criteria or information items then, as already mentioned hereinbefore, it will be necessary to insert control characters for indicating the individual search criteria, and which enable the skipping of the information items which are not required. To this end it is merely necessary to provide a further recognizing circuit 13 with the aid of which the control characters can be recognized, and which then correspondingly controls the ring counter 3.

It is assumed again that the tape storage contains the above mentioned block information, but now a search is conducted for the name MÜLLER in connection with the profession TEACHER (LEHRER), so that in this case the place of residence is of no particular interest, and may be skipped. In addition to the stated tape information there are inserted the control characters *b*, so that the control character $b_N$ indicates the name, the control character $b_W$ indicates the place of residence, and the control character $b_P$ indicates the profession, so that the tape information now looks as follows:

. . . *y* $b_N$ MÜLLER *y* $b_W$ MÜNCHEN *y* $b_P$ LEHRER *y* . . .

The search storage 2, in accordance with the search task, contains the search criteria

*y* $b_N$ MÜLLER *y* $b_P$ LEHRER *y e*

Accordingly, there is first of all found the name, until from the search storage there is offered the control character $b_P$, and until from the tape storage there is offered the control character $b_W$ to the comparator 6. This provides a negative comparison result, so that the line 10 is marked, and on account of which the ring counter 3 would actually be reset to zero. This, however, must be avoided because the search is not yet completed. If, therefore, the control character $b_P$ is recognized by the recognizing circuit 13 then, via the OR-circuit 14 and the inhibition circuit 15, the ring counter 3 is prevented from being reset. In this way the control character $b_P$ will further remain in the intermediate storage 7 and will cause, in the case of all further unequal comparison results, the counter will remain in the reached position. If now, in the course of the further comparison cycles, the control character $b_P$ is also fed from the tape storage 4 to the comparator, then the output line 9 of the comparator 6 will be marked again and, consequently, the ring counter 3 will be stepped on by one step, so that now the first letter of the following search word will be contained in the intermediate storage 7. The comparison is now continued in the positive way, as mentioned hereinbefore, until there is found the end or terminating character *e*, so that on account of this, the search process is interrupted successively. It is thus possible for randomly combined search information items to be picked out of the tape information in the course of one operating cycle.

If the tape information contains a group of information which is assigned in common to all other information items, then these may be regarded as one search criterion which may be identified by one prefixed control character of its own. This kind of information representation is suitable for passenger lists used in connection with flight bookings. In this case the search is also possible when several passengers with the same surname but with different Christian names are contained in the list, provided that all surnames are preceded by the respective Christian names, so that the information items contained in the tape storage will e.g. look as follows:

. . . $b_V$ EMIL $b_V$ ADOLF $b_N$ MEYER $b_V$ ANNA $b_N$ MÜLLER $b_F$ Flight Data . . .

For the sake of simplicity, the spacing characters *y* have been omitted in this case. The flight data consists of a fixed number of characters, and are therefore treated as one search criterion which is preceded by the control character $b_F$.

The search may now be successively directed to a certain passenger, for example, to the passenger with the name ADOLF MEYER, because the recognizing circuit 13 is capable of recognizing all control characters, and each time releases the corresponding control functions. Thus, the name ANNA MÜLLER is skipped after the wanted name ADOLF MEYER has been found, until the control character $b_F$ has been read out of the tape storage, and the flight data are thus compared in the comparator 6. In cases where not all characters of the flight data are supposed to be considered during the search, a special character "x" may be inserted at those points which do not serve the search purpose, because the number of characters of the flight data is assumed as being fixed. The special character $x$ is likewise recognized by the recognizing circuit 13 and effects, on one hand, by the OR-circuit 14 and the inhibition circuit 15, that the ring counter 3 is not being reset and, on the other hand, via the OR-circuit 16, that the ring counter 3 is stepped on each comparison cycle in spite of the unequal comparison result. After the end or terminating character $e$ has been found, the search is again interrupted as having been successful. By the signal transmitted over the line 12, it is effected that the tape storage is stopped during the next start-stop interval in order that the information may be read out of the tape in the course of a later read-out process.

The foregoing specification inlcudes references to many elements that are well known in the art and from which many computer and data apparatus are derived. For example, the publication entitled "Computer Basics" by Technical Educational and Management, Inc., 1962, discloses typical arrangements for the elements shown and described in the specification. The search storage element may be of the type described in chapter 2, volume 4, of "Computer Basics." A typical ring counter 3 would be one of the types shown on pages 179 to 186 of volume 4; the tape storage element may be seen by the example on pages 38 to 41 of volume 4. The comparator 6 as well as the recognizing circuits 11 and 13 may be of the type illustrated on pages 140 to 142 of volume 4. The intermediate storage 7 may be found by way of example in Chapter 2, volume 4, and the inhibit gate 15 may be of the type as described on pages 199 to 204, volume 3, of "Computer Basics." It is thus seen that all of the elements shown or described are well known in the computer and data processing art to enable one skilled in the art to practice this invention.

While he has described above the principles of his invention in connection with specific apparatus, it is to be clearly understood that this description is made only by way of example and not as a limitation to the scope of his invention as set forth in the objects thereof and in the accompanying claim.

What is claimed is:

Apparatus for performing on-the-fly searches for information stored in a blockwise fashion on magnetic tapes with control character stored between the blocks of stored information, a special control character at those points which do not serve the search purpose, and an "END" signal at the end of the information comprising: main storage means for retaining information items; search storage means containing several storage cells for receiving one character of search information transferred from the main storage means; tape storage means for storing and sequentially reading information items from magnetic tape; ring counter means connected with the search storage means and having as many stages as positions are contained in the search storage means such that the output of one counting stage is connected to control one storage cell of the search storage means; intermediate storage means for storing in rhythm with the tape storage mean that particular character of the search storage means whose associated stage of the ring counter means is marked; comparator means interconnected between the tape storage means and the intermediate storage means and responsive in rhythm with the tape storage mean to the respective signals thereof to generate a first signal upon a first output conductor upon the determination that the two signals are "alike" and to generate a second signal upon a second output conductor upon the determination that the two signals are "not alike"; first recognizing circuit means for recognizing control characters and special control characters and responsive to the output of the intermediate storage means for generating an output signal upon the occurrence of any one of the plurality of control or special control characters, first OR gating means interconnected between the comparator means first output conductor, the special control character portion of the first recognizing circuit means and the ring counter whereby the occurrence of an "alike" determination or a special control character causes a signal to be gated to the ring counter to step the ring counter to the next position so as to progress to the next search storage stage, second OR gate means responsive to the first recognizing circuit means output signals for passing a single signal upon the occurrence of any one of the control or special control characters, inhibition gating means connected to the comparator means, the second OR gate means and ring counter whereby the occurrence of a "not alike" determination by the comparator causes a signal to reset the ring counter to a zero count unless the "not alike" signal is inhibited by the control character signal from the first recognizing circuit whereby blocks of information may be searched for with intermediate blocks of information being skipped as controlled by the first recognizing circuit; and second recognizing circuit means connected to the output of the intermediate storage means and responsive to the occurrence of the END signal for generating a READ OUT signal indicating that the information on the tape has been discovered in the search storage means.

References Cited by the Examiner

UNITED STATES PATENTS

| | | | |
|---|---|---|---|
| 2,892,184 | 6/1959 | Joel et al. | 340—172.5 X |
| 2,900,132 | 8/1959 | Burns et al. | 340—172.5 X |
| 2,996,699 | 8/1961 | Kramskoy | 340—172.5 |
| 3,018,956 | 1/1962 | Hosier et al. | 235—157 |
| 3,030,609 | 4/1962 | Albrecht | 340—172.5 |
| 3,066,280 | 11/1962 | Perry | 340—172.5 |
| 3,075,178 | 1/1963 | James | 340—172.5 |
| 3,107,343 | 10/1963 | Poole | 340—172.5 |
| 3,126,523 | 3/1964 | Rabenda et al. | 340—172.5 |
| 3,197,742 | 7/1965 | Rettig et al. | 340—172.5 |

ROBERT C. BAILEY, *Primary Examiner.*

P. J. HENON, *Assistant Examiner.*